Figure 1:
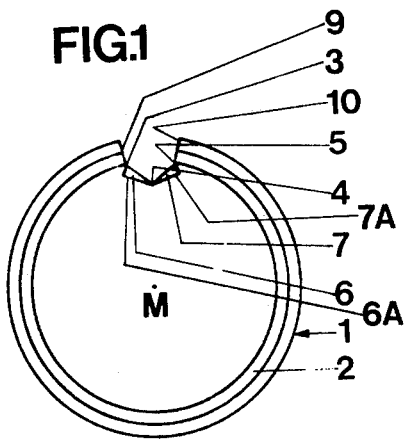

United States Patent [19]

Timmer

[11] 4,151,779
[45] May 1, 1979

[54] LOCK AND SPACER RING

[75] Inventor: Hendrikus J. M. Timmer, Tiel, Netherlands

[73] Assignee: SKF Industrial Trading & Development Company B.V., Nieuwegein, Netherlands

[21] Appl. No.: 803,961

[22] Filed: Jun. 6, 1977

Related U.S. Application Data

[63] Continuation of Ser. No. 647,717, Jan. 16, 1976, abandoned.

[30] Foreign Application Priority Data

Jan. 22, 1975 [NL] Netherlands .......................... 7500736

[51] Int. Cl.² .......................................... F16B 21/00
[52] U.S. Cl. ......................................... 85/8.6; 85/8.8; 308/DIG. 11; 403/326
[58] Field of Search ..................... 85/8.6, 8.8, 8.9, 51; 403/326, DIG. 6; 16/2; 248/56; 24/256; 308/DIG. 11, 236

[56] References Cited

U.S. PATENT DOCUMENTS

| 1,211,349 | 1/1917 | Prahl | 248/56 X |
|---|---|---|---|
| 1,694,354 | 12/1928 | Rollason | 85/8.6 |
| 2,384,668 | 9/1945 | Ensinger et al. | 85/8.6 X |
| 2,860,540 | 11/1958 | Karlsson | 85/8.6 |
| 2,888,852 | 6/1959 | Conner | 85/8.6 |
| 3,122,383 | 2/1964 | Hirsch | 85/8.8 X |
| 3,853,413 | 12/1974 | Parran | 403/326 X |
| 3,894,309 | 7/1975 | Yuda | 16/2 |

Primary Examiner—Rodney H. Bonck
Attorney, Agent, or Firm—Daniel M. Rosen

[57] ABSTRACT

A ring for locking and spacing two components situated in a cylindrical bore, characterized in that said ring has a closed uninterrupted angular shape and comprises a weakened part which allows the adjacent end parts to be pressed to each other without disengaging said end parts from said weakened part.

17 Claims, 4 Drawing Figures

LOCK AND SPACER RING

This is a continuation of application Ser. No. 647,717 filed Jan. 16, 1976, and now abandoned.

The invention refers to a ring of locking and axial spacing two components that are located in a cylindrical bore. The invention particularly refers to spacing of two bearings in the hub of a wheel at a distance from each other and locking the bearing in an axial direction.

In general, automation of a mounting operation is difficult, because the known applied elements, called circlips, used for locking and spacing machine components such as bearings, become easily entangled in each other and obstruct this operation. Circlips are open ring-like elements which can be mounted automatically with special tools. They are disadvantageous, mainly due to their separated endparts, in that the rings become entangled, Disentangling of these rings, which must be carried out by hand, will have a most detrimental effect on the efficiency of the mounting operation. In addition, when two rings are to be mounted at some distance from each other, in a bore one ring must pass the groove of the other, an operation difficult to carry out automatically unless the rings are placed in the bore from either side.

It is therefore the principal object of the invention to introduce a ring as described above which can be mounted automatically in a bore where in two adjacent machine components such as bearings are applied. According to the invention this object is achieved by providing a ring with a closed uninterrupted angular shape and including a weakened part which allows the adjacent endparts to be pressed to each other without disengaging the endparts from the weakened part.

A ring-like locking element is known from the German Patent No. 1,074,921 which describes an element comprising two parts, which at one end are hingeably connected and at the other end are disengageably coupled. This means that the end, parts can easily be detached from each other and the same disadvantages exist as herein described before.

According to a preferred embodiment of the invention the weakened part during pressing of the adjacent end part is mainly moved in radial direction. This measure enables the mounting and locking of the ring in the groove of a bore. This weakened part preferably comprises two or more relatively thin sections being situated at certain distances from each other and functioning as hinges for their connecting part a strip-like element. When the ring is made from a suitable plastic for example a polymer such as polyamide, a relatively cheap, reliable locking and spacer ring can be obtained.

According to another preferred embodiment of the invention, the strips are dimensioned and have a degree of resilience such that after the ring has been placed in a groove of a bore the strips can flick or spring outwardly to lock the ring efficiently. Owing to this, the locking ring cannot simply be dislodged from the groove. When a wheel shaft has to be mounted which has a smaller diameter than the inner bore of the ring, it is possible to select dimensioned strip-like elements such that in the assembly the strips cannot flick or spring back from their position.

A ring, according to the invention, in its axial direction can have different sectional views such that it can be located in a correct position in the bore and space the bearings correctly. When applying the ring such as in a wheel hub it is now possible to mount said ring by means of a tapered tool, having its smallest diameter equal to the bore of the wheel hub, automatically.

Figure 2:
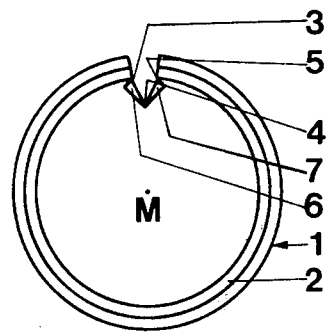
Figure 3:
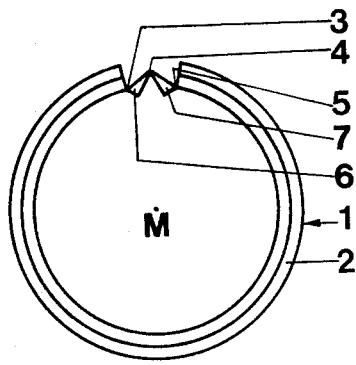
Figure 4:
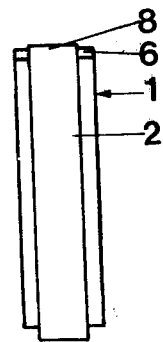

An embodiment of the invention will now be described by way of example with reference to the accompanying drawing, in which:

FIG. 1 shows a ring in a position before mounting;
FIG. 2 shows a ring under tension during mounting;
FIG. 3 shows a ring in its lock-position in a groove of a bore;
FIG. 4 shows a side view of said ring.

The ring generally designated as 1 and depicted in the drawing, consists of an annular part 2 of a mainly rectangular cross-section and is made of plastic or other appropriate resilient material. A part of this ring can be replaced by a weakened section consisting of three hinges 3,4,5 and two strip-like elements or strips 6 and 7. These strips have a triangular cross-section when viewed from the front side. The hinges consist in this preferable embodiment of thin parts made of the ring material itself. This embodiment enables the ring to be pressed to the position as shown in FIG. 2, according to which the ring is set under tension and transferred to its correct location in a bore (not shown). This location will be maintained after mounting due to projection 8 (FIG. 4) which is present at the circumference of ring 1. Projection 8 corresponds with the width of a groove in a bore. It is also possible that the ring has a rectangular cross-section only. If for some reason it is undesirable that the strip-like elements 6 and 7 project towards the centre point (M) as for example, due to the subsequent mounting of a shaft, it is possible to construct a ring according to the invention in which strip-like elements 6 and 7, due to the ring material properties and strip dimensions, have sufficient resilience to flick or spring outwardly to the ring circumference (FIG. 3) after the ring has been placed in the groove of a bore. According to this measure, the ring is locked and cannot simply be dislodged from the groove because after the shaft has been mounted. The specifically executed or dimensioned strips thus now have no possibility of flicking or springing back to their original position as shown in FIG. 1. The strips 6 and 7 preferably have a triangular cross-section when viewed from the front side. Therefore the flat sides 6A, 7A resp. will define a sharp angle in the position in which the ring is set under tension. For applying the ring in spacing two bearings, as for example in a wheel hub, it is an advantage when the projection 8 is present at the circumference of the ring, corresponding with a groove in a bore of the hub.

When the ring is mounted automatically into the bore of a device by means of a tapered tool, the smallest diameter of which is equal to the bore of the wheel hub, the ring 1 is set under tension and thus will snap into the groove of said bore, after which the strips 6 and 7 may subsequently be flicked or spring outward in a mainly radial direction.

It will be apparent that the structure in accordance with the invention is particularly adaptable for use as a retaining ring or a spacing ring, for bearings or the like, wherein the bearings extend radially inwardly of a bore surface of a housing. In such use, the rings in accordance with the invention may serve only to prevent axial movement of the bearings, and their rings in accordance with the invention do not serve as running surfaces for a shaft extending through the bearings. Thus, in order to simplify insertion of the rings in a bore, while inhibiting the snapping of the rings out of position in use, the rings may be designed such that the strips extend radially inwardly of the remainder of the rings when the central hinge thereof has been flipped outwardly to engage the bore, as shown in FIG. 1. With this configuration, the later inserted shaft will inhibit the unlatching of the toggle formed by the hinged elements of the invention, by preventing further inward movement of these elements, so that the ring must remain in place in the bore.

An advantage of this type of assembly over the known assembly in which two circlips in a bore are applied is that the number of parts to be mounted is reduced to one element only. Another advantage is that just one groove has to be machined as compared with the known devices showing two grooves in a hub and in which more circlip elements must be placed. In addition, mounting can now be carried out automatically since the defined lock and spacer rings cannot become entangled with other rings.

It is understood however that the claimed principle is not restricted to the shown and described embodiment since other ring constructions can be manufactured accordance with the spirit and scope of the invention.

I claim:

1. A locking and spacing structure comprising a ring having closed unitary uninterrupted structural shape, one portion of said ring interrupting the remainder thereof and being weakened between a pair of end parts so as to be deformable and deformed from said uninterrupted shape so as to project radially from the area defined by said shape in the unstressed state of the ring, said weakened area including first and second circumferentially extending strips, meeting at a common point of greater deformability than said elements and forming a middle hinge, said strips being joined at their respective terminations with the respective end parts of said ring at points of greater deformability than said strips and forming hinges at said terminations, said strips being formed to have portions that extend radially inward of the remainder of said ring when said hinges are bent with said middle hinge at the radius equal to the outer radius of said remainder of said ring.

2. The structure of claim 1, wherein said weakened part, during pressing of said end parts, moves in a radial direction.

3. The structure of claim 1, wherein said weakened part comprises two or more relatively thin sections situated at a predetermined distance from each other and functioning as hinges for their respective connecting strips.

4. The structure of claim 3, wherein said strips are dimensioned such that, and have a degree of resilience such that, after said ring is adapted to be placed in a groove of a bore, said strips move outwardly to lock said ring.

5. The structure of claim 3, wherein said strips have a cross-section mainly triangular in shape and have flat sides defining a sharp angle under tension when locked.

6. The structure of claim 1, wherein a projection is present at the circumference of said ring which corresponds to a groove in the bore of a mechanical part.

7. The structure of claim 1, wherein said ring is adapted to be fitted on a tapered tool, whereby said ring can be automatically mounted in a bore of a mechanical part.

8. The locking and spacing structure of claim 1, wherein said weakened portion is radially displaced with respect to said remainder of said ring.

9. The locking and spring structure of claim 8, wherein said weakened portion is displaced radially inwardly with respect to said remainder of said ring.

10. The locking and spacing structure of claim 1, wherein said strips have triangular cross-section, with their apexes joining at said common point location.

11. The locking and spacing structure of claim 1, wherein said one portion has less radial thickness than said remainder throughout its extent, and is radially displaced inwardly of said one portion.

12. The locking and spacing structure of claim 1, wherein said strips have triangular cross-section with their apexes joining at said middle hinge, said one portion being displaced radially inwardly with respect to said remainder.

13. A retaining ring and spacer element comprising a continuous ring of a resilient material, the outer circumferential surface of said ring being interrupted at a given arcuate section to form a pair of spaced apart end faces, said ring being formed in said given arcuate section by a bridging portion of radial thickness lesser than the remainder of said element throughout its extent and joining the end faces at the radially innermost edge thereof, said bridging portion having minimum radial thickness at longitudinally extending joints thereof with said end faces and along a central longitudinally extending line, whereby hinges are formed at said joints and along said line, the regions of said bridging portion immediately adjacent said joints extending radially inward of the remainder of said element when said hinges are bent with the hinge at said line at the radius of said outer circumferential surface.

14. The element of claim 13, wherein said end faces extend radially in longitudinal planes.

15. The element of claim 13, wherein the portion of said element away from said bridging portion has a substantially uniform transverse cross section throughout its extent.

16. The element of claim 15, wherein said portion of said ring away from said bridging portion has a projection extending radially outward from said outer circumferential surface and having an axial dimension less than said outer circumferential surface, said bridging portion extending axially to the same extent as the remainder of said element.

17. A retaining ring and spacing structure comprising a resilient ring having an arcuate portion with radially outwardly and inwardly directed surfaces, said arcuate portion being interrupted circumferentially by a bridging portion joined at its ends to said arcuate portion radially inwardly of said outwardly directed surface, said bridging portion having axially extending portions of reduced radial dimension at each said end forming a pair of hinges with said arcuate portion, and an axially extending portion of reduced radial dimension intermediate said hinges and forming a third hinge, whereby a pair of strips are formed between said hinges, said strips being formed to have portions extending radially inwardly of said inwardly directed surface of said ring when said bridging portion is hinged outwardly with said third hinge at the radius of said outwardly directed surface.

* * * * *

UNITED STATES PATENT AND TRADEMARK OFFICE
CERTIFICATE OF CORRECTION

PATENT NO. : 4,151,779
DATED : May 1, 1979
INVENTOR(S) : Hendrikus J.M. Timmer

It is certified that error appears in the above–identified patent and that said Letters Patent are hereby corrected as shown below:

```
Col. 1, line  3, Change "of" to --for--.
Col. 1, line 29, Change "where in" to --wherein--.
Col. 1, line 40, After "end" delete --,--.
Col. 1, line 44, Insert --,-- after "invention".
Col. 1, line 51, After "plastic" insert --,--.
Col. 2, line  1, After "hub" insert --,--.
Col. 2, line 39, Delete "because".
Col. 2, line 46, Change  "For" to --In--.
Col. 2, line 56, Change "spring" to --sprung--.
Col. 3, line 22, After "manufactured" insert --in--.
Col. 4, line  4, Change "spring" to --spacing--.
Col. 4, line 44, Change "outward" to --outwardly--.
```

Signed and Sealed this

First Day of April 1980

[SEAL]

Attest:

Attesting Officer

SIDNEY A. DIAMOND

Commissioner of Patents and Trademarks